United States Patent [19]

Fitchett et al.

[11] Patent Number: 5,561,806

[45] Date of Patent: *Oct. 1, 1996

[54] SERIAL CHANNEL ADAPTER

[75] Inventors: John A. Fitchett, Centreville; Thomas J. Hahn, Vienna; Gary L. Rouse, Manassas, all of Va.

[73] Assignee: International Business Machines Corporation, Armonk, N.Y.

[*] Notice: The term of this patent shall not extend beyond the expiration date of Pat. No. 5,374,386.

[21] Appl. No.: 206,290

[22] Filed: Mar. 7, 1994

Related U.S. Application Data

[63] Continuation of Ser. No. 693,834, Apr. 30, 1991, abandoned.

[51] Int. Cl.$^6$ .................................................. G06F 3/00
[52] U.S. Cl. ........................................ 395/800; 395/309
[58] Field of Search .................................. 395/800, 325, 395/275, 309, 850

[56] References Cited

U.S. PATENT DOCUMENTS

| | | | |
|---|---|---|---|
| 4,231,086 | 10/1980 | Tarbox et al. | 395/289 |
| 4,413,319 | 11/1983 | Shultz et al. | 395/850 |
| 4,430,704 | 2/1984 | Page et al. | 395/700 |
| 4,514,823 | 4/1985 | Mendelson et al. | 395/822 |
| 4,524,440 | 6/1985 | Orsic | 370/54 |
| 4,535,453 | 8/1985 | Rhodes et al. | 370/110.1 |
| 4,635,192 | 1/1987 | Ceccon et al. | 395/282 |
| 4,712,176 | 12/1987 | Fredericks et al. | 395/309 |
| 4,751,634 | 6/1988 | Burrus, Jr. et al. | 395/883 |
| 4,777,591 | 10/1988 | Chang et al. | 395/800 |
| 4,780,814 | 10/1988 | Hayek | 395/285 |
| 4,787,028 | 11/1988 | Finfrock et al. | 395/285 |
| 4,878,173 | 10/1989 | Goekjian | 395/842 |
| 4,908,823 | 3/1990 | Haagens et al. | 370/85.1 |
| 4,935,868 | 6/1990 | DuLac | 395/290 |
| 5,027,343 | 6/1991 | Chan et al. | 370/17 |
| 5,121,390 | 6/1992 | Farrell et al. | 370/94.1 |
| 5,210,749 | 5/1993 | Firoozmand | 370/85.1 |
| 5,220,659 | 6/1993 | Larson et al. | 395/500 |
| 5,230,052 | 7/1993 | Dayan et al. | 395/700 |
| 5,247,616 | 9/1993 | Berggren | 395/200.08 |
| 5,301,350 | 4/1994 | Rogan et al. | 395/800 |
| 5,379,386 | 1/1995 | Swarts | 395/309 |

OTHER PUBLICATIONS

IBM TAB "System Bus Interface for 300 Megabit Serial Adapter", vol. 32, No. 4B by Bailey et al.

*Primary Examiner*—Alyssa H. Bowler
*Assistant Examiner*—John Follansbee
*Attorney, Agent, or Firm*—Joseph C. Redmond, Jr.

[57] ABSTRACT

An apparatus for facilitating the transfer of data between computers of different types and architectures is disclosed. The Serial Channel Adapter (SCA) includes four primary functional components: 1) low-end parallel bus interface; 2) data staging buffer; 3) serial interface; and 4) adapter controller, all of which are under microprocessor control and fully programmable to achieve maximum flexibility. Two buses are provided, a Local Data Bus and Local Processor Bus, to minimize processor overhead on the data bus and maximize data throughput.

22 Claims, 6 Drawing Sheets

SERIAL CHANNEL ADAPTER

This application is a Continuation of U.S. Ser. No. 07/693,834, filed Apr. 30, 1991, now abandoned by J. A. Fitchett et. al, entitled "Serial Channel Adapter", assigned to the same assignee as this application.

BACKGROUND INFORMATION

1. Field of the Invention

This invention relates to an apparatus for transferring data between computers. In particular, apparatus which is programmable to enable computers having different architectures to communicate efficiently is described.

2. Background of the Invention

The use of computers of various types, sizes and architectures within enterprises is well-known. Unfortunately, however, data residing in one computer often needs to be accessed by other computers. Because these computers may be of different sizes, types or architectures, data transfer may not always be fast and efficient.

This problem has been addressed in the prior art in a variety of manners. One solution is to provide a custom interface box for each unique combination of computers. Obviously, this would require the design, development, manufacture and support of a great number of unique products since the number of possible combinations of computers available is significant. Therefore, it is desirable to provide a single apparatus that can be programmed to provide a communications interface suitable for most data communications requirements.

OBJECTS OF THE INVENTION

It is an object of this invention to provide an apparatus for facilitating the transfer of data between computers.

It is a further object of this invention to provide an apparatus which is programmable to accommodate computers of disparate types and architectures.

It is still another object of this invention to provide an apparatus for transferring data between a mainframe computer having a serial channel and a computer having a low-end parallel bus.

SUMMARY OF THE INVENTION

These objects, and other features and advantages as will become apparent, are achieved by the Serial Channel Adapter apparatus. The Serial Channel Adapter (SCA) includes four primary functional components: 1) low-end parallel bus interface; 2) data staging buffer; 3) serial interface; and 4) adapter controller, all of which are under microprocessor control and fully programmable to achieve maximum flexibility. Two buses are provided, a Local Data Bus and Local Processor Bus, to minimize processor overhead on the data bus and maximize data throughput.

DESCRIPTION OF THE PREFERRED EMBODIMENT

Figure 1:
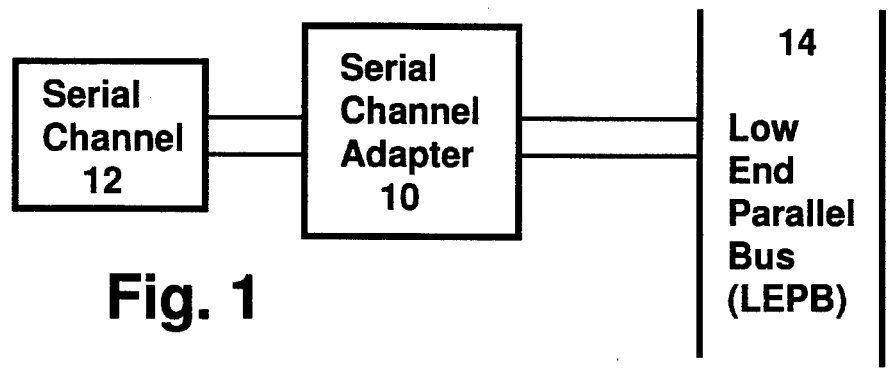
FIG. 1 shows a block diagram of a general system environment for the Serial Channel Adapter.

Referring to FIG. 1, one purpose of this invention is to provide a Serial Channel Adaptor 10 between an IBM (IBM is a registered trademark of International Business Machines Corporation) 370 architecture Serial Channel 12 and a low-end parallel bus (LEPB) 14. The serial channel adapter 10 is a programmable hardware interface. In the preferred embodiment, the low-end parallel bus 14 is a Micro Channel (Micro Channel is a registered trademark of International Business Machines Corporation) bus, but the application of the invention should not be limited to the Micro Channel architecture. Likewise, the IBM 370 Serial Channel 12 is the preferred serial channel, but the invention is equally pertinent to other types of serial channels.

Those skilled in the art have a detailed understanding of 370 serial channels and Micro Channel buses, and further detailed description is beyond the scope of this invention. Additional information on Serial Channels and Micro Channel architecture can be found in the following publications, *Serial I/O Architecture;* PKD081102, Feb. 29, 1988 and *Low End Parallel Bus Architecture, Family* 2; LEPB-ADS-0002-00-4U7 available from the IBM Corporation.

Figure 2:
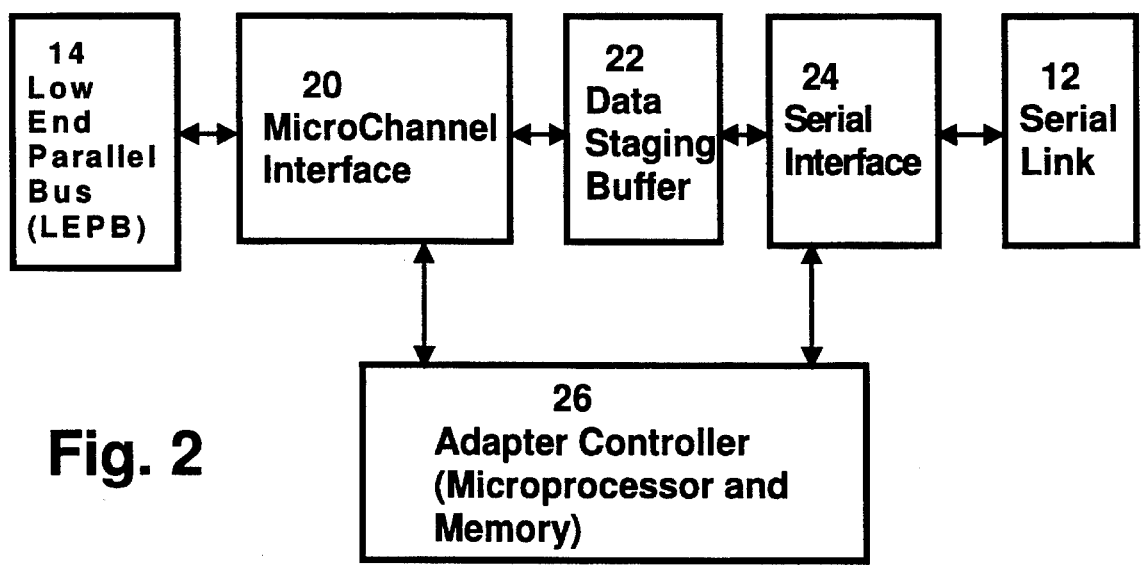
FIG. 2 shows a block functional diagram of the Serial Channel Adapter.

FIG. 2 shows a functional overview of the various components that comprise the Serial Channel Adapter 10. The Micro Channel Interface block 20 represents the circuits that provide the following functions: Programmable Option Select, address generation/translation, bus arbitration, Data Memory Access (DMA) Controller, command status processor and a local processor software to system process or command/status interface.

Block 22 represents the circuitry required for high speed data buffering which is necessary for efficient utilization of the bandwidths of the Serial Channel 12 and the LEPB 14. Block 24 represents the serial input/output circuitry which includes optical signal/digital electrical signal conversion, clock recovery, synchronization, serial/parallel conversion, optic decoding/encoding, and clock conversion. A serial request/command processor is also included to provide frame level handshaking over the serial channel.

The SCA 10 is microprocessor controlled, as represented by block 26. This allows all serial I/O to be controlled locally without system processor involvement with serial I/O interface level transfers. Device level transactions are interpreted locally with only minimal system processor interaction. The microcode to operate the microprocessor block 26 includes a Reliability, Availability, and Serviceability (RAS) function and the required operational function to store and forward messages between the interfaces 20, 24.

Figure 3:
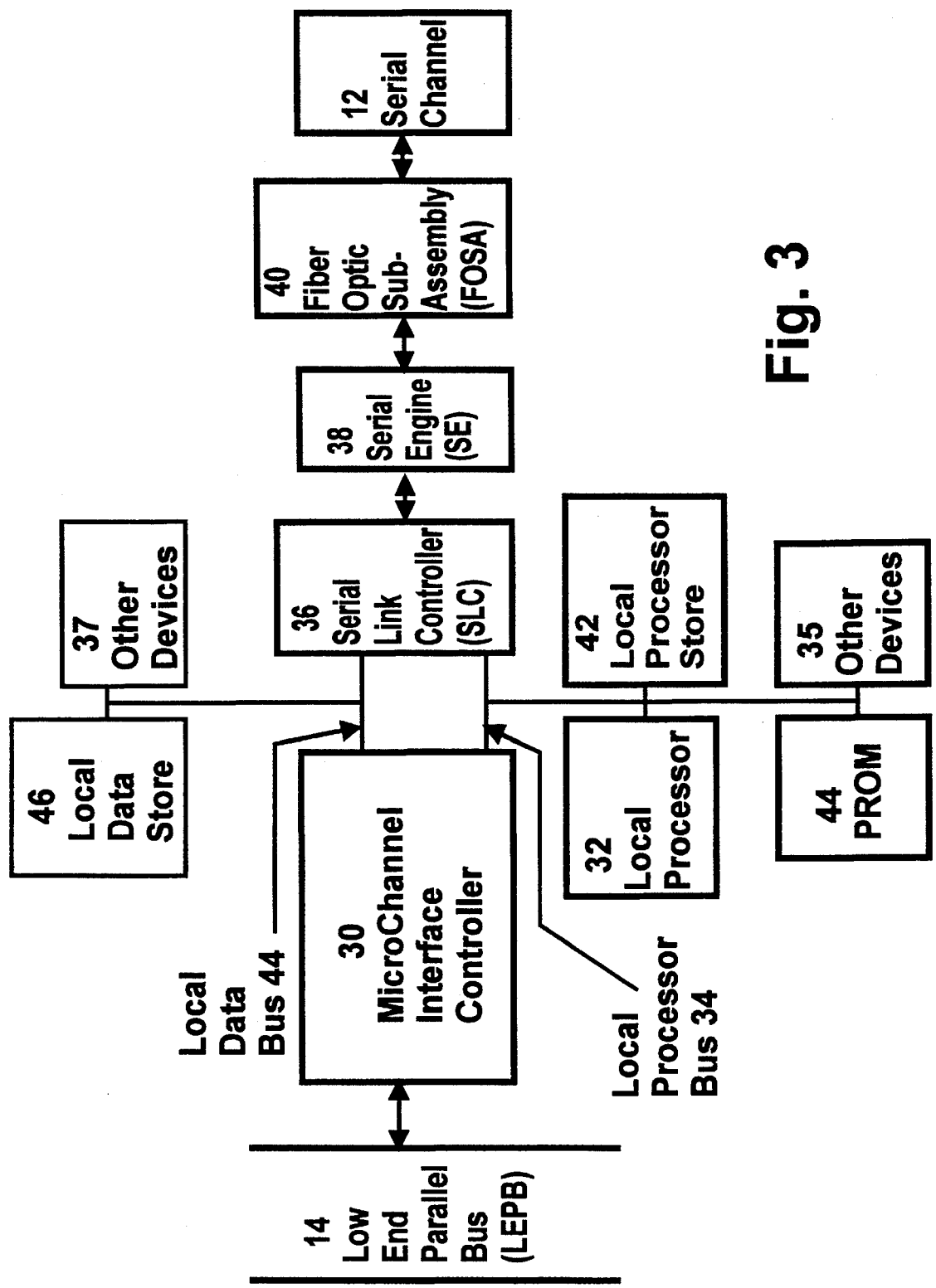
FIG. 3 shows a high-level block diagram of the architecture of the Serial Channel Adapter.

With reference to FIG. 3, the specific hardware that implements the functions just discussed will be described. The first major component is the Micro Channel Interface Controller (MIC) 30. The MIC 30 is the interface to the LEPB 14. It performs all the master/slave functions that the LEPB 14 specifies are possible with that bus. The MIC 30 is also the queue interface for the queues on the SCA. Further description of the MIC 30 can be found below.

The next major component is the Local Processor 32 which is an INTEL 80960. Local Processor 32 provides the programmability for the SCA and is the general processor on the SCA card. The MIC 30 and the Local Processor 32 share the Local Processor Bus 34 with the Serial Link Controller (SLC) 36 as masters. The Serial Link Controller 36, as the name implies, is the interface to the Serial Engine 38 and on out to the fiber optic subassembly (FOSA) 40.

There are two memories hanging off of the Local Processor Bus 34 (LPB), namely the Local Processor Store 42 and the bootstrap PROM 45. A Local Processor Store 42, is the storage location for INTEL 80960 programs, MIC control structures and a few other logical entities. The bootstrap PROM 45 contains vital product data for the card, as well as the diagnostics and initialization code for all of the devices.

There is another bus, the Local Data Bus (LDB) 44, that separates the data from the processing functions. The SLC 36 and the MIC 30 are the only two masters on the LDB 44. They share a resource called the Local Data Store (LDS) 46. Basically, the Local Data Store 46 is a stopping point for data that is passing from the serial side to the LEPB 14, or that is passing from the LEPB 14 to the serial side. For example, when some data comes in from the LEPB 14, the MIC 30 would move the data initially into the Local Data Store 46. It would then notify the Local Processor Store 42 that the data is present and the Local Processor 32 would start up the Serial Link Controller 36 to move the data from the Local Data Store 46 to the Serial Channel 12. There is almost an exact inverse operation for data going in the opposite direction from Serial Channel 12 to LEPB 14.

The Local Processor Store 42 is the location where Local Processor main programs are stored. It is also the place where the basic communication between the MIC 30 and the outside world goes on. The Local Processor 32 can put an entry on a local processor queue to notify the MIC 30 that it has a job to move out on the marker channel, or an LEPB device can put an entry on a local processor queue, in the Local Processor Store, to notify either the MIC 30 or the LP 32 that there is some data to be moved into the Local Data Store.

Figure 4:
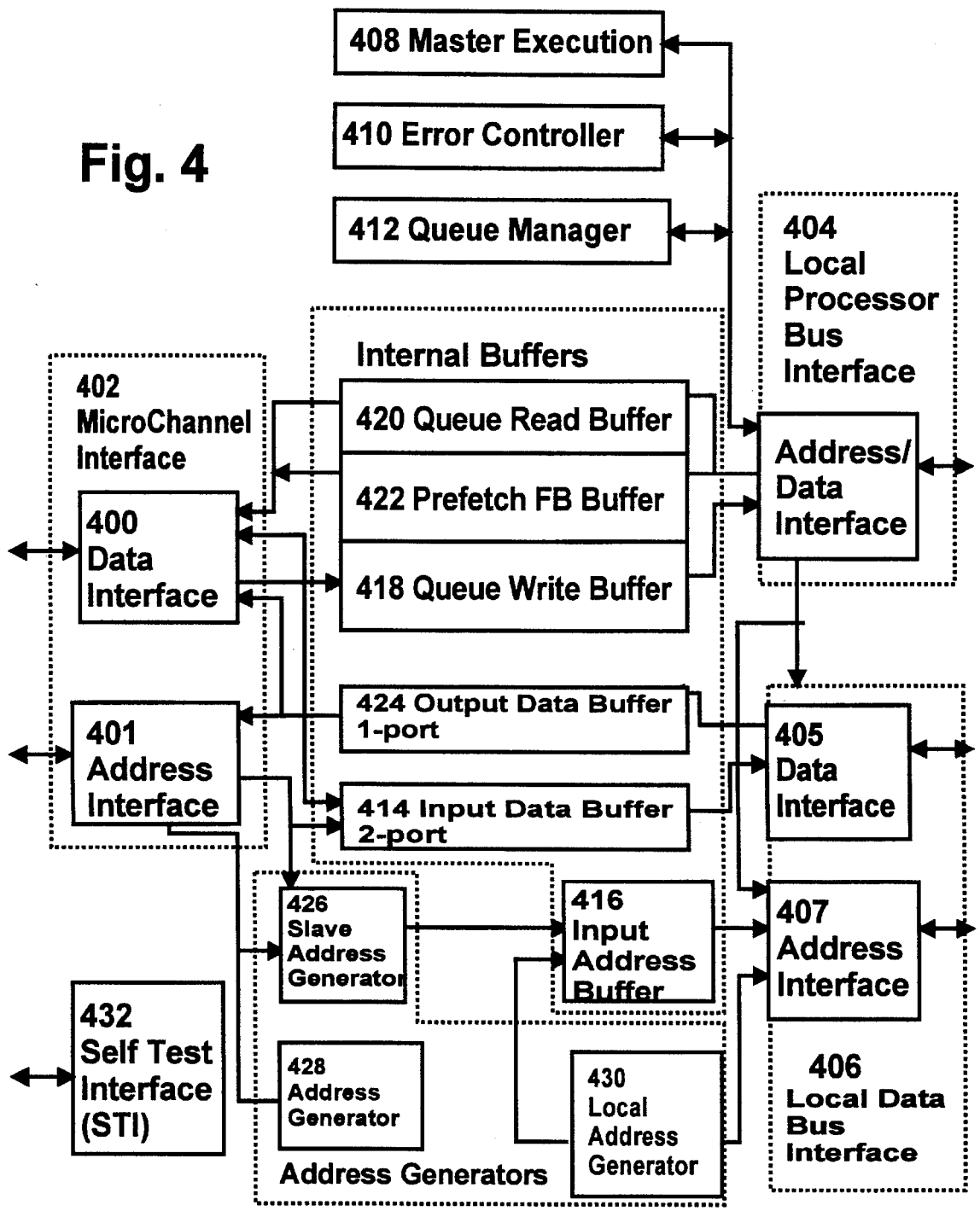
FIG. 4 shows a block functional diagram of the Micro Channel Interface Controller.

With reference to FIG. 4, the MIC will now be described in more detail. The Micro Channel Interface, represented by block 402, is responsible for implementing the proper timing, control, and data interfacing required to connect the MIC to the LEPB bus. The interface 402 contains logic to synchronize, interpret, and control address, data, arbitration, parity, interrupt and control hand-shaking signals with the other units within the MIC. The interface 402 allows the operation of two Micro Channel modes, the basic transfer mode and the streaming data mode.

The basic transfer mode defines the default protocol of the Micro Channel. While operating in this mode, the MIC can be defined by the following Micro Channel bus device types: intelligent bus controller; I/O slave; memory; and setup slave. When operating as an intelligent bus controller, the MIC is considered to be a Micro Channel master. The MIC only becomes a Micro Channel master when a command and transfer has been initiated. While operating as an I/O, memory or setup slave, the MIC is considered to be a Micro Channel slave. The MIC only becomes a Micro Channel slave when initiated by another device acting as a Micro Channel master.

The streaming data mode allows the MIC to participate in high speed data transfers with other streaming data mode Micro Channel devices. Streaming data mode provides significant performance enhancements for transfers of large blocks of data and automatic speed matching for clock synchronous data transfers. While in streaming data mode, the MIC will operate as one of the following Micro Channel types: Streaming Data Master or Streaming Data Slave. The MIC operates as a Streaming Data Master only when initiated by a command transfer and operates as a Streaming Data Slave when initiated by another device acting as a Streaming Data Master.

The Local Processor Bus Interface 404 is responsible for implementing the proper timing, control, and data interfacing required to connect the MIC to the LPB. The LPB Interface 404 contains logic to control the address, data, arbitration, interrupt, parity, error and control hand-shaking signals. The MIC can operate as a master or as a slave on the LPB. LPB master operations can be initiated by tasks necessary to execute and complete a commanded transfer, a Micro Channel device, a reportable error, or maintenance of the pre-fetch free block buffer. Slave operations are controlled by devices on the LPB requesting access to the LDB, the MIC Queue Management function or error and internal MIC control and initialization registers.

The Local Data Bus Interface 406, which includes Data Interface 405 and Address Interface 407, is responsible for implementing the proper timing, control, and data interfacing required to connect the MIC to the LDB. LDB interface 406 contains logic to control the address, data, arbitration, parity, error, and control signals. LDB master operations are initiated by a commanded transfer, a Micro Channel device, or by a LPB device.

The Master Execution unit (block 408) is responsible for controlling and coordinating all commanded transfer activities between other units within the MIC. The Master Execution unit 408 performs the following tasks:

Monitors the Queue Manager for pending commanded transfers;

Coordinates fetching of MIC command words and MIC control blocks with the LPB interface;

Controls the initialization and loading of the Micro Channel Address Generator, the Local Address Generator, and the Output Data Buffer;

Controls when the Micro Channel Interface fetches free blocks from other Micro Channel devices;

Coordinates the data transfer between the Micro Channel Interface and LDB interface 406;

Coordinates the Micro Channel Interface queue write operations for posting completion status to other Micro Channel devices; and Controls the posting of MIC status words which indicates completion status of the commanded transfer and possible errors which may have occurred.

Error Controller block 410 monitors MIC internal activities for possible errors situations or conditions. If an error occurs, the Error Controller 410 is responsible for coordinating with the LPB Interface 404 for posting of an unsolicited status word.

Queue Manager 412 is responsible for controlling hardware pointers indicating the current locations of pending command words, status words, or free blocks in current locations where new command words, status words, or free blocks can be entered. The Queue Manager 412 is also responsible for indicating to either the MIC or a LPB device whether a queue contains pending data.

The MIC contains six internal buffers. These buffers are used to speed match and coordinate data transfers between the Micro Channel, Local Processor Bus, and Local Data Bus Interfaces. Input Data Buffer 414 is a 16×36-bit, 2-port FIFO buffer capable of holding 64 bytes of data and byte data parity. The purpose of the Input Data Buffer 414 is to buffer data transfers during all Micro Channel slave operations and Micro Channel master read operations to and/or from the MIC LDB Interface 406.

Input Address Buffer 416 is a 16×23 bit, 2-port FIFO buffer. Its purpose is to buffer addresses and control signals related to data stored in the Input Data Buffer 414. The Queue write Buffer 418 is a 16×25 bit, 2-port FIFO buffer. Its purpose is to buffer data, parity and control which is designed for a queue on the LPB managed by the Queue Manager 412. Write access to the Queue write Buffer 418 is controlled by the Micro Channel Interface 402.

Queue Read Buffer 420 is a 8×18 bit, 2-port FIFO buffer. Its purpose is to buffer up to 16 bits of queue data and parity requested by a Micro Channel device. The Pre-fetch Free Block Buffer 422 is a 8×18 bit, 2-port FIFO buffer. Its purpose is to maintain four 4 bit free block entries for quick access by a Micro Channel device.

The Output Data Buffer 424 is a 16×36 bit, 1-port FIFO buffer capable of holding 64 bytes of data and byte parity. Its purpose is to buffer Micro Channel master data from the MIC LDB to the Micro Channel Interface 402, or the Input Data Buffer 414 for LDB wrap operations. The loading and unloading of the Output Data Buffer 424 is controlled by the MIC LDB and Micro Channel Interface 402 under the guidance of the Master Execution unit 408.

The MIC contains three address generators which provide most of the addressing requirements for data transfer between the Micro Channel and LDB Interfaces 406. Slave Address Generator 426 is used during the Micro Channel streaming data slave and LDB wrap operations to provide addresses to the Input Address Buffer 416 which correlates the data being received by the Micro Channel Interface 402.

The Micro Channel Address Generator 428 is used during commanded transfer operations. It provides the Micro Channel Interface 402 with addresses needed for Micro Channel master operations. The Local Address Generator 430 is used during commanded transfers to address data destined to or sourced from the LDB Interface 406. While the Local Address Generator 430 can access 1M bytes of data, it can only increment addresses within a 64K byte address range during a single commanded transfer period.

The Self Test Interface 432 provides a serial interface for diagnostic and debug operations. It provides control and access to scan strings, registers, and clock controls within the MIC.

Figure 5:
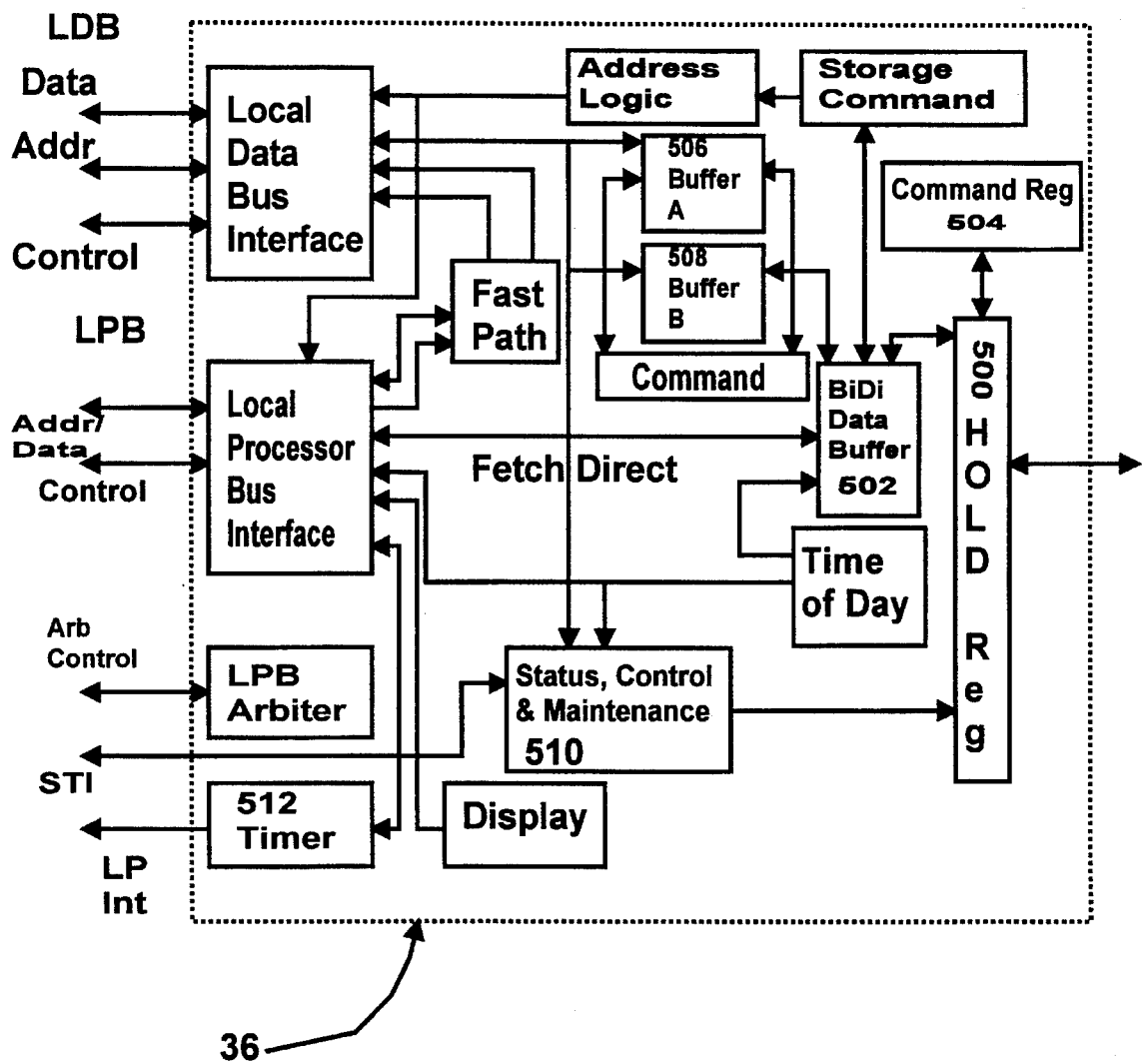
FIG. 5 shows a block functional diagram of the Serial Link Controller.

Referring to FIG. 3, the Serial Link Controller 36 coordinates access by the Serial Engine 38 (FIG. 3) and Local Processor 32 to the LDS 46. The SE communicates to the SLC by using the SE to Channel Request Handler Bidirectional Bus. The LP 32 communicates to the SLC 36 using the LPB 34. The SE 38 requires control information stored in the LPS 42 and gains access to this information through the SLC 36 referring now to FIG. 5. The BiDi Hold Register 500 receives the commands and data directly from the BiDi Bus each clock cycle. The BiDi Data Buffer 502 is a 64 bit plus 8 bit parity register that forms the data from the BiDi Holder Register 500 or from internal to the SLC. The SE Command Register 504 stores and decodes the storage command. The Storage Register 504 stores and decodes the command information. This register may consist of the storage address counter to be incremented as the data is stored or fetched. The Multi-Channel Buffers (MCB A) 506 and MCB B 508 are a pair of 128 byte buffers that hold 16 data words under direct SE control and are used to fetch and store data from either the LDS or LPS. The two MCB's 506, 508 support a continuous data transfer over the BiDi Bus while allowing shared access by other devices 35, 37 on the LPB and LDB, respectively. The MCB's must be initialized prior to using them. The Fetch Direct function supports a single data word fetch for test and set from either LPS or LDS without disturbing the contents of the MCB's. The Status and Control Registers 510 contain SLC composite conditions.

The SLC supports a 16 bit Programmable Interval Timer counter that provides a periodic interrupt to the LP everytime the programmed maximum value is reached. The SLC also provides the necessary synchronization logic to insure proper timing with the LP reading of this function.

The Time Of Day clock 512 is a 31 bit resolution clock readable by the SE and LP. The TOD is derived via a buffered off-adapter clock source to keep it synchronize with that of other SLC's.

Figure 6:
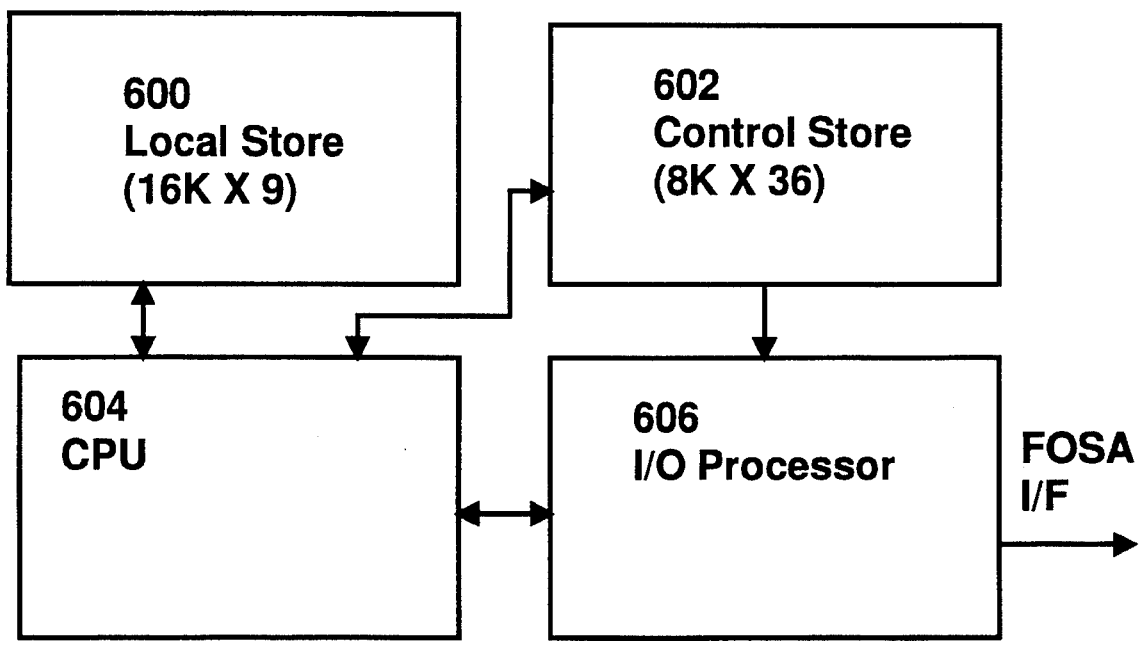
FIG. 6 shows a block diagram of the Serial Engine.

The Serial Engine 38 (FIG. 3) is shown in block form in FIG. 6. With the SLC, the Serial Engine acts as a gateway between either the LDB or LPB and the 370 Serial Channel via the Fiber Optic Subassembly. The SE consists of a Local Store 600, a Control Store 602, a CPU 604 and an I/O Processor 606. The SE performs 8B/10B encoding and decoding of the serial data to form a continuous 10 bit parallel symbol stream that is presented to the FOSA. The received data is decoded as a continuous 10 bit parallel symbol stream from the FOSA. Messages transferred are bound into logic units called frames. Each frame contains a Start Delimiter, a Header and Information Field, and a Trailer. The Serial Engine generates the proper sequences of frames to facilitate the transfer of messages between the host and the SCA, when the SCA acts as a control unit, and between the SCA and a control unit, when the SCA acts as part of Channel to Channel adapter.

Figure 7:
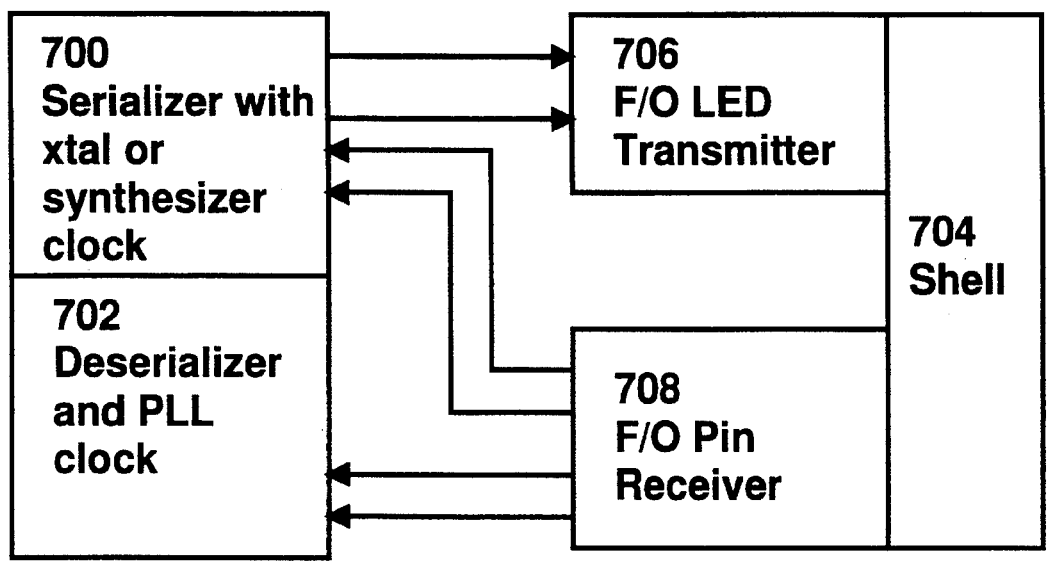
FIG. 7 shows a block diagram of the Fiber Optic subassembly.

The Fiber Optic Subassembly is shown in FIG. 7. The FOSA provides the optic data interface to the System 370 device. Normally, only simplex operations occur via the interface. Specifically, data frames are transferred in one direction. Simultaneous transmission and reception of data frames is not permitted. The following functions make up the FOSA: a Serializer 700, a Deserializer 702, a 200 MHZ synthesizer or oscillator (not shown) and a transmitter/receiver shell 704. The transmitter/receiver shell 704 is comprised of a fiber optic LED transmitter 706, a fiber optic PIN receiver 708.

The Serializer 700 converts a 20M byte per second, 10 bit parallel data stream to the 200M bit per second serial data stream for the transmitter 706. The Deserializer 702 converts the 200M bit per second serial data stream from the receiver 708 into a retimed 20 megabyte per second, 10 bit parallel data stream.

One of the major functions that the SCA provides is the ability to perform Micro Channel master/slave DMA functions that were enabled by the Micro Channel architecture. The MIC chip can perform as a Micro Channel master/slave. It can transfer data in a DMA fashion, as well as communicate over the Micro Channel bus independent of the system processor. What this allows is the removal of the system processor from the communication loop and sets up a direct communication between the SCA via the MIC to other cards at a 80 megabyte rate.

Another function that the MIC chip provides is the queue management function. It provides a set of queue registers that it manages for the software, the software being programmed and executing off of the local INTEL processor. Sixteen possible queues are provided that vary in size from 256 to a maximum of 1K entries, and with widths from 4 bytes to 16 bytes.

Figure 8:
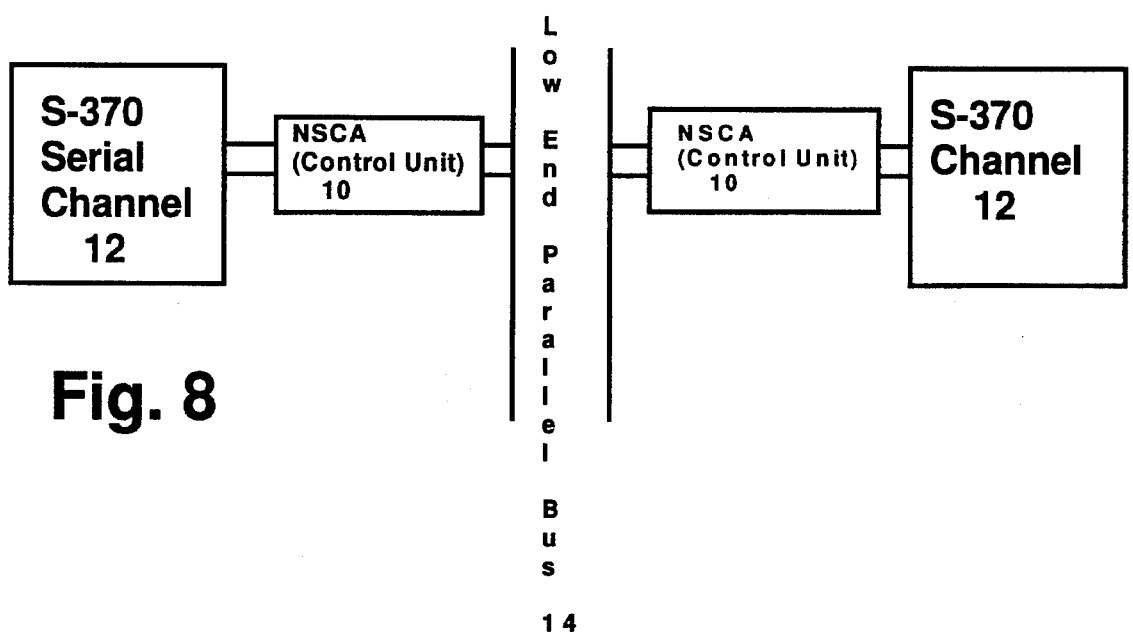
FIG. 8 shows a block diagram of the Serial Channel Adapter in a Channel to Channel environment.
Figure 9:
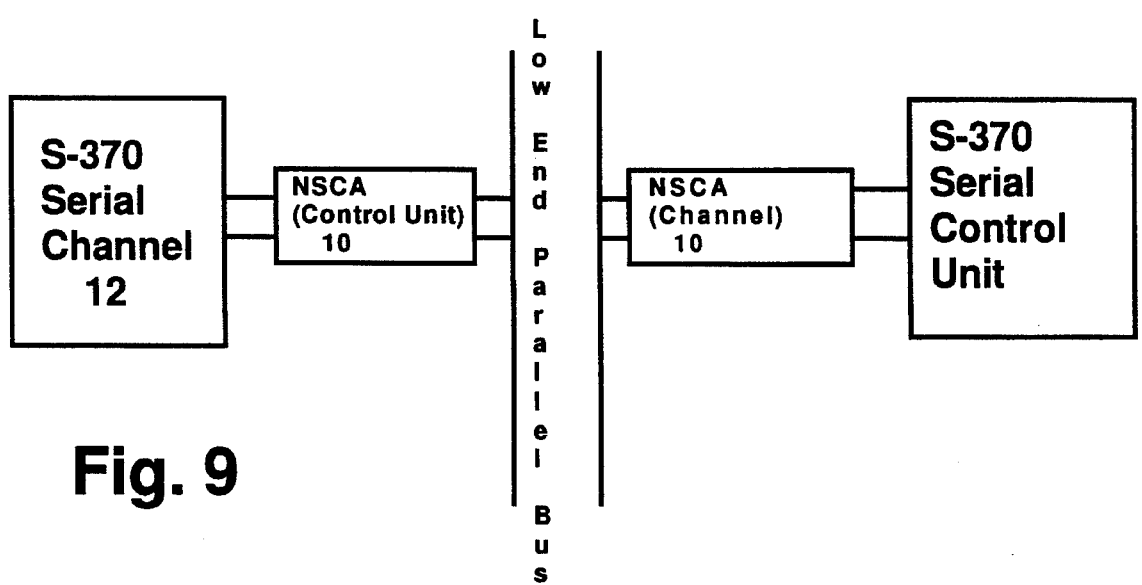
FIG. 9 shows a block diagram of the Serial Channel Adapter in a channel extension system environment.

In the System/370 architecture, there are basically two entities for communication, a control unit and a channel. A channel initiates transactions and a control unit receives a transaction and is the controller of a device. In a channel, there must be some level of intelligence to execute channel programs. It acts as an interface to a control unit and I/O processor on a host. A control unit does not have the same intelligence because it only responds to transactions and provides a lower level of service for a given device. The advantage of the SCA is that it can act either as a control unit or a channel. The hardware architecture is such that the same hardware is used on either application. The application is totally personalized by the 80960 program load in conjunction with the Serial Engine programs. A channel application executes a channel program and initiates transactions. In a control unit environment, the Serial Engine load services the 370 serial protocol in the control unit fashion and responds to transactions initiated by another channel down stream. Therefore, since the SCA can function both as a control unit and as a channel, it can be useful in a channel to channel communication system as illustrated in FIG. 8, or in a channel to control unit environment as illustrated by FIG. 9.

While the invention has been described with reference to a preferred embodiment, it will be understood by those skilled in the art that various changes can be made to the architecture without departing from the spirit and scope of the invention. Accordingly, the invention shall be limited only as specified in the following claims.

We claim:

1. A communication interface between a serial bus and a low-end parallel bus (lepb) comprising:

a) a sole local data bus for separately transmitting and receiving data exchanged between the low-end parallel bus and the serial bus;

b) a sole local processor bus for handling control instructions related to data transfers on the local data bus, the local data and local processor buses being physically and logically separated from one another, the local processor bus only providing processing instruction as data transfer occurs on the local data bus between the low-end parallel bus and the serial bus;

c) a lepb interface connected between the low-end parallel bus and to one end of the local data and local processor buses;

d) a serial link controller including multi-channel buffers connected to the other end of the local data and local processor buses and to a serial channel through a serial engine, the channel including a fiber optic link, the serial link controller controlling access by the serial engine and a local processor to a local data store;

e) the serial channel further including fetch direct means for a single word fetch from either a local processor store coupled to the local processor bus or the local data store coupled to the local data bus without disturbing the contents of data stored in the multi-channel buffers;

f) the local processor only connected to the local processor bus for controlling the transfer of data between the low-end parallel bus and the serial bus;

g) the local data store connected to the local data bus only for buffering data exchanged between the low-end parallel bus and the serial bus; and h) the local processor store connected to the local processor bus for storing and providing program instructions to the local processor for the transfer of data between the low-end parallel bus and the serial bus.

2. The communication interface of claim 1 wherein the lepb interface performs timing control and data interfacing required to connect to the low-end parallel bus.

3. The communication interface of claim 2 wherein the lepb interface means operates in a data streaming mode using internal buffers which speed match and coordinate data transfers among the low-end parallel bus, local processor bus and local data bus.

4. The communication interface of claim 2 further including a master execution means for controlling and coordinating all transfer activities between the lepb interface and a local data bus interface, and a queue manager for controlling pointers indicating the current location of command words, status words or free blocks in local processor store.

5. The communication interface of claim 4 further including a read only memory coupled to the local processor bus for storing initialization codes to activate the lepb interface for data transfer.

6. The communication interface of claim 1 wherein the local data bus is coupled to a local data bus data interface means and a local data bus address interface for timing, control and data interfacing to directly connect the low end parallel bus to the local data bus.

7. The communication interface of claim 1 wherein the local processor and the local processor store are programmable to transfer data between the lepb interface coupled to the lepb and the serial link controller coupled to the serial bus for transmitting and receiving data in parallel and serial form.

8. The communication interface of claim 7 wherein the local data store notifies the local processor when to start up the serial link controller to move data in the local data store to the serial channel.

9. The communication interface of claim 8 wherein the serial engine coupled to the serial link controller performs encoding and decoding of serial data to form a parallel data stream.

10. The communication interface of claim 9 wherein the serial engine generates sequences of frames to transfer messages between the serial channel and the local data bus.

11. The communication interface of claim 1 wherein the local processor store may be programmed to change input/output protocols, data frame size, and data packet size of data on the local data bus.

12. The communication interface of claim 1 wherein the fiber optic link includes a serializer coupled to a light emitting transmitter, and a pin receiver coupled to the serializer and a deserializer for converting serial data streams at one data rate in megabytes to a parallel data stream at a different rate or a parallel data stream at one data rate to a serial data stream at a different rate in megabytes.

13. The communication interface of claim 1 wherein the serial engine comprises a processor coupled to a control store, a local store and an I/O processor for generating the proper sequences of data frames for the transfer of data between the serial channel and the local data bus.

14. The communications adapter of claim 1 wherein the lepb interface includes data buffers and performs direct storage in the data buffers and subsequent transmission of data to the local data bus in a master mode using a data streaming mode.

15. The communications adapter of claim 14 wherein the lepb interface performs direct storage in the data buffers and subsequent transmission of data to the local data base in a slave mode using a basic transfer mode.

16. The communications adapter of claim 14 wherein the lepb interface performs direct storage in the data buffers and subsequent transmission of data to the local data base in a slave mode using a data streaming mode.

17. A method of transferring data in either direction between a low-end parallel bus and a serial bus using an interface controller, a serial link controller, a local data bus and a local processor bus coupled to the interface controller and the serial link controller for the transfer of data therebetween under the control of a local processor and local processor store coupled to the local processor bus and a local data store coupled to the local data bus, comprising the steps of:

a) initiating a command on the low-end parallel bus to the interface controller or the serial bus to the serial controller for the transfer of data;

b) transferring the data only on the local data bus to the local data store;

d) notifying the local processor to initiate transfer of the data only on the local data bus under the control of instructions only on the local processor bus;

(e) controlling access by a serial engine and the local processor to the local data store using the serial link controller including multi-channel buffers, the serial link controller being connected to a serial channel through the serial engine, the channel including a fiber optic link;

f) managing the transfer of data in either direction between the low-end parallel bus and the serial link controller using a master execution unit and a queue manager in the interface controller, the master execution unit controlling and coordinating all commanded transfers within the interface controller and the queue manager controlling pointers to the location of data, command words, and status words in internal buffers contained in the interface controller; and g) conducting a single word fetch from either the local processor store coupled to the local processor bus or the local data store coupled to the local data bus without disturbing the contents of data stored in the multi-channel buffers.

18. The method of claim 17 further comprising the step of transferring the data in a master mode using a basic transfer mode.

19. The method of claim 18 further comprising the step of transferring the data wherein the interface controller acts as a master device in the transfer of the data to the low-end parallel bus.

20. The method of claim 18 further comprising the step of transferring the data wherein the interface controller acts as a slave device in the transfer of the data to the low-end parallel bus.

21. The method of claim 17 further comprising a step of coordinating access by the serial engine and the local processor to the local data store using the serial link controller.

22. The method of claim 21 further comprising a step of transferring the data to the serial bus using the serial engine as a gateway between the local data bus, the local processor bus and the serial bus, the serial engine generating the proper sequence of frames to facilitate messaging between the low-end parallel bus and the serial bus.

* * * * *